JOHN W. PLETCHER JR.
INVENTOR.

BY Oltsch & Knoblock
ATTORNEYS.

Patented Jan. 1, 1952

2,581,288

UNITED STATES PATENT OFFICE 2,581,288

RESILIENT SCREW FASTENER

John W. Pletcher, Jr., South Bend, Ind.

Application May 13, 1946, Serial No. 669,327

2 Claims. (Cl. 85—36)

This invention relates to improvements in resilient screw fasteners.

The primary object of the invention is to provide a device of this character which is simple in construction, inexpensive to manufacture, easy to apply, and which is strong and sturdy.

A further object is to provide a device of this character which serves effectively both as a fastener and as a resilient member to take up vibration and thereby prevent loosening or release of the fastener incident to vibration.

A further object is to provide a device of this character which is usable with threaded members of different diameters and threads within a predetermined range so that it is not necessary to use a device constructed specially to fit a given threaded part or screw.

Other objects will be apparent from the following description and specification.

Figure 1:
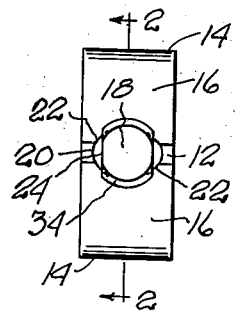
Fig. 1 is a view of one embodiment of the invention as seen when viewing the end of a threaded part.
Figure 2:
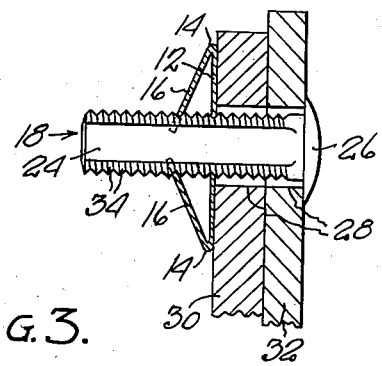
Fig. 2 is a sectional view taken on line 2—2 of Fig. 1.
Figure 3:
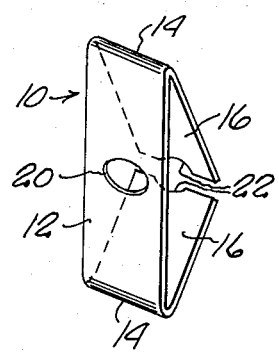
Fig. 3 is a perspective view of the fastener.

Referring to the drawing, and particularly to Figs. 1 to 3, which illustrate one embodiment of the invention, the numeral 10 designates a fastener. This fastener is formed from sheet metal having requisite hardness and resilience, i. e., spring stock. The fastener is formed from an elongated substantially rectangular blank of sheet stock, and has a central flat portion 12 defined by transverse bends 14 from which similar flat end portions 16 extend at acute angles in angularly diverging relation. The ends of portions 16 terminate in substantially equally spaced relation to the central portion 12 opposite the longitudinal center thereof, and are spaced apart a distance less than the diameter of the screw or threaded part 18 with which the fastener cooperates and upon which it is mounted.

The flat central portion 12 of the fastener has transversely elongated aperture 20, preferably of oval shape, formed therein in equi-spaced relation to the end-defining bends 14 and also centered transversely of portion 12. The dimension of aperture 20 at its major axis exceeds the diameter of the threaded part 18 measured at the crest of the threads thereof; and the diameter of said aperture at its minor axis is preferably equal to the diameter of the threaded part measured at the root of the threads. The free edges of the portions 16 of the fasteners have shallow curved notches 22 therein centrally thereof and of a width exceeding the diameter of threaded part 18.

The device is intended for use with a threaded member 18 having flat faces 24 at diametrically opposite portions thereof which are spaced apart a distance not greater than the thread-root diameter of member 18. The member 18 will preferably have the usual enlarged head 26 at one end thereof which may be of any conventional or desired shape and size and which is here shown as a carriage bolt head. The threaded member passes through the articles which are to be secured together thereby, for example, through the registering apertures 28 in the members 30 and 32, and is of a length to project therefrom at its threaded end.

The fastener is applied over the projecting end of the threaded member, with its part 12 innermost, by holding the same in position with the major axis of aperture 20 parallel to the flat face 24. When so positioned, the fastener may be slid longitudinally on member 18 to a position with part 12 thereof bearing against and in engagement with the part 30. Thereupon, the parts may be interlocked by relative rotation of the fastener and threaded member approximately 90° in a thread-tightening direction. The angle of rotation need not be exactly 90° but must be sufficient for interlocking of the fastener with the threads 34 between the flats 24 and less than 180° or such angle which would permit release of that interlocking engagement at the flats 24. It will be observed that a double interlock is provided, i. e., at the part 12 and at the ends of the parts 16. In other words, the edges of aperture 20 adjacent the minor axis thereof fit between threads 34, and the notched portions 22 fit between threads spaced longitudinally from those engaged by the edges of aperture 20.

By reason of the resilience of the fastener, it is placed under stress or tensioned by the advance of the parts to follow the lead of the threads upon the partial rotation. Thus tight frictional engagement of part 12 with member 30 is achieved, together with a stressed or tensioned position of parts 16. These factors cause the device to serve a function similar to a spring or lock washer, so that vibration of the parts is absorbed by flexing of the fastener, and there is no tendency of the fastener to rotate to releasing position incident to such vibration. To insure a tight interlock of the notched edges 22 of parts 16 with the threads 34, the same may be bent for yielding frictional engagement with the flats 24 while being applied, as is obvious. This also serves to insure automatic accommodation of variations in the size or diameter of said threaded member 18.

Figure 4:
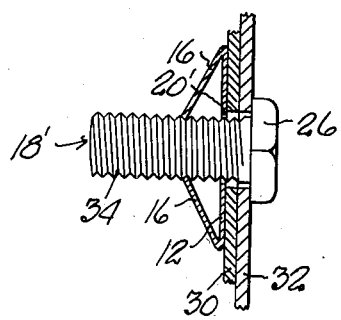
Fig. 4 is a sectional view similar to Fig. 2 illustrating a modified embodiment of the invention.

The form of the fastener illustrated in Fig. 4 is the same as that shown in Fig. 3 with the exception that the aperture 20' in the central portion thereof is preferably circular and is of a larger diameter than the threaded member 18' so as to fit freely thereover. Consequently, the threaded member 18' may have its threads 34 extending continuously therearound and the formation of flat faces thereon is unnecessary. The edges of parts 16 have the same notches 22 as above described.

In the use of this form of the device, the fastener may be slid over the threaded member 18' with the portion 12 foremost without requiring any predetermined angular relation of the parts for the operation. Inasmuch as the parts 12 are in a trailing position, they are free to spring over the threads 34 during application of the fastener. When the part 12 engages part 30, the fastener and threaded member may be relatively rotated to the extent required to firmly lock the parts 12', 18', 30 and 32. This embodiment of the invention has all of the advantages of the Fig. 3 embodiment, except that of double, longitudinally spaced threaded interlocked engagement of the parts. It also possesses the advantages of adaptability for use with any threaded part or screw, relative rotation on the threaded part through any angle desired, and applicability to a wider range of sizes of threaded parts. In the latter connection, it will be apparent that the opening 20' may be quite large since no interlock is effected at part 12. Therefore, by changing the angle at which the parts 16 are bent, and therefore the spacing of the notched edges 22, the fastener may be adapted to threaded members of any size ranging from the largest size which will pass through aperture 20' down to the smallest size which the notches will accommodate without requiring the notched edges to engage each other.

Figure 5:
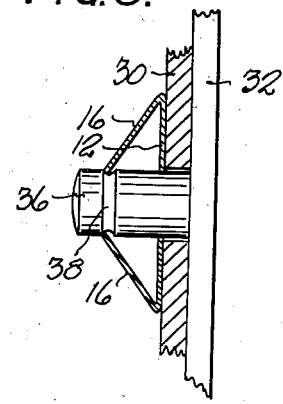
Fig. 5 is a sectional view similar to Fig. 2 and illustrating another type of assembly with which the device may be used.

While the fastener finds its greatest application in cooperation with threaded members, it has other applications also. One such application is illustrated in Fig. 5, and uses a fastener of the same type as shown in Fig. 1 and described above. In this application the outermost part 32 to which part 30 is to be secured has a stud 36 fixed thereto and projecting therefrom. The stud is plain, with the exception of a circumferential groove 38 therein spaced from the inner face of member 30. The groove 38 may be of any desired transverse shape, as the arcuate shape shown, and is preferably wider and deeper than the customary grooves between standard screw threads. For such installations the fastener is preferably designed to cooperate and fit tightly with the parts with which it is used. In other words, it is so proportioned and dimensioned that it will slide freely over the stud into engagement with part 30, and then by a slight pressure the free ends of the parts 12 thereof will drop into and anchor themselves firmly in the groove 38 without substantial release of the applied tension. This embodiment of the device has particular utility for use in manufacturing processes where a fastener of positive action adapted to apply at least slight tension, capable of fast assembly, and which is easily manipulable for intentional release of the assembled parts, is desired. It will be apparent that the stud in this case need not be of circular cross-section, and that the groove need not extend continuously therearound, inasmuch as any stud providing opposed grooves for receiving the free ends of parts 16 may be used.

Other embodiments of the fastener which fall within the spirit of the invention and the scope of the claims are deemed to be included within the purview of the invention.

I claim:

1. In combination, a screw-threaded securing member having diametrically opposed flats, and a fastener member comprising a stiff resilient elongated body bent transversely to define a central portion and a pair of converging end portions, said central portion having an elongated opening therein having a major dimension greater than the diameter of said securing member and a minor dimension for interlocking engagement with said screw threads and greater than the spacing of said flats, the free edges of said end portions being adapted for resilient interlocking engagement with said screw threads, said securing member being freely slidably insertible in said fastener when said flats are parallel to the major dimension of said elongated opening and interlocking with said fastener at the opening of said central portion and at the free edges of said end portions upon partial rotation of one of said securing and fastener members relative to the other.

2. In combination, a screw-threaded securing member having diametrically opposed flats, and a fastener member comprising a stiff resilient elongated body bent transversely to define a central portion and a pair of converging end portions, said central portion having an elongated opening therein having a major dimension greater than the diameter of said securing member and a minor dimension for interlocking engagement with said screw threads and greater than the spacing of said flats, the free edges of said end portions being adapted for resilient interlocking engagement with said screw threads, said securing member being freely slidably insertible in said fastener when said flats are parallel to the major dimension of said elongated opening and interlocking with said fastener at the opening of said central portion and at the free edges of said end portions upon partial rotation of one of said securing and fastener members relative to the other, the free edges of the end portions of said fastener being centrally notched.

JOHN W. PLETCHER, Jr.

REFERENCES CITED

The following references are of record in the file of this patent:

UNITED STATES PATENTS

| Number | Name | Date |
|---|---|---|
| Re. 22,049 | Tinnerman | Mar. 10, 1942 |
| 1,243,859 | Neider | Oct. 23, 1917 |
| 1,261,014 | Dorgan | Apr. 2, 1918 |
| 1,472,242 | Covi | Oct. 30, 1923 |
| 1,890,348 | Weatherhead | Dec. 6, 1932 |
| 2,200,702 | Oddie | May 14, 1940 |
| 2,230,916 | Tinnerman | Feb. 4, 1941 |
| 2,259,425 | Murphy | Oct. 14, 1941 |
| 2,342,690 | Place | Feb. 29, 1944 |
| 2,454,223 | Shippee | Nov. 16, 1948 |